United States Patent
Bulot et al.

(10) Patent No.: US 10,655,486 B2
(45) Date of Patent: May 19, 2020

(54) KNIFE-EDGE FASTENING WITH SEAL FOR A STRAIGHTENER BLADE

(71) Applicant: SAFRAN AIRCRAFT ENGINES, Paris (FR)

(72) Inventors: Benjamin Bulot, Moissy-Cramayel (FR); Claire Marie Figeureu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 22 days.

(21) Appl. No.: 16/109,042

(22) Filed: Aug. 22, 2018

(65) Prior Publication Data

US 2019/0063238 A1  Feb. 28, 2019

(30) Foreign Application Priority Data

Aug. 22, 2017  (FR) ...................................... 17 57796

(51) Int. Cl.
*F01D 9/04* (2006.01)
*F01D 11/00* (2006.01)

(52) U.S. Cl.
CPC ............ *F01D 9/042* (2013.01); *F01D 11/005* (2013.01)

(58) Field of Classification Search
CPC ........ F01D 5/30; F01D 5/3023; F01D 5/3046; F01D 9/042; F01D 11/005; F05D 2260/36

See application file for complete search history.

(56) References Cited

U.S. PATENT DOCUMENTS

| | | | | |
|---|---|---|---|---|
| 2,145,597 | A * | 1/1939 | Hait | F04D 29/167 415/131 |
| 2,872,156 | A * | 2/1959 | Brown | F01D 9/042 415/209.4 |
| 5,074,752 | A * | 12/1991 | Murphy | F01D 9/042 415/119 |
| 5,797,725 | A | 8/1998 | Rhodes | |
| 7,670,116 | B1 | 3/2010 | Wilson, Jr. et al. | |
| 2006/0120869 | A1 | 6/2006 | Wilson, Jr. et al. | |
| 2007/0258811 | A1 | 11/2007 | Shi et al. | |
| 2008/0260538 | A1 | 10/2008 | Wilson, Jr. et al. | |
| 2009/0193657 | A1 | 8/2009 | Wilson, Jr. et al. | |
| 2010/0290917 | A1 | 11/2010 | Wilson, Jr. et al. | |

(Continued)

FOREIGN PATENT DOCUMENTS

EP  1 239 119 A1  9/2002
FR  3 038 351 A1  1/2017

OTHER PUBLICATIONS

Preliminary Search Report and Written Opinion dated Apr. 17, 2018 in French Patent Application No. FR1757796, 9 pages (with English translation of category of cited documents).

*Primary Examiner* — Richard A Edgar
(74) *Attorney, Agent, or Firm* — Oblon, McClelland, Maier & Neustadt, L.L.P.

(57) ABSTRACT

An assembly for a turbine engine or turbine engine test bed, including a hub defined about a longitudinal axis, a blade, including a blade root, extending in a radial direction to the longitudinal axis, the hub including a recess capable of receiving the blade root by insertion in the radial direction, wherein the recess includes a groove, the blade root including a groove, so that the two grooves are facing each other when the blade root is inserted into the recess, the assembly further includes a seal located in the two grooves.

10 Claims, 2 Drawing Sheets

(56) References Cited

U.S. PATENT DOCUMENTS

2011/0020137 A1    1/2011   Wilson, Jr. et al.
2011/0305580 A1   12/2011   Wilson, Jr. et al.
2012/0156035 A1    6/2012   Justl et al.

\* cited by examiner

KNIFE-EDGE FASTENING WITH SEAL FOR A STRAIGHTENER BLADE

GENERAL TECHNICAL FIELD

The invention relates to the field of fixing a stator blade to an inner shroud in a turbine engine for an aircraft or in a turbine engine test bed for an aircraft.

This type of stator blade is found, for example, on OGVs (outlet guide vanes), or straighteners, arranged downstream from a rotating body for straightening the air flow.

In particular, the invention relates to knife-edge type fastenings, and not dovetail fastenings, conventionally used for the rotating blades.

PRIOR ART

FIG. 1 represents a blade 10, located in a vein V, typically a dual-flow turbine engine secondary vein Vs. The turbine engine is arranged about a longitudinal axis.

The blade 10 extends radially within the vein Vs for straightening the air flow moving from upstream to downstream. It comprises an intrados and an extrados.

To this end, the blade 10 is fastened at an outer end 12 to a casing 20, radially located outside the vein V, and at another inner end 14 (called the blade root) to a hub 30, located radially inside the vein V.

Typically, an OGV type straightener comprises a plurality of blades 10 distributed circumferentially about the hub 30.

A fastening is made on the casing 20, which will not be described. At the hub 30, the fastening is made by inserting, in a radial direction, the inner end 14 into a recess 32 formed on or in the hub 30. The recess 32 then acts as a longitudinal and tangential stop for immobilizing the blade 10 in the vein.

More specifically, the recess 32 is a complementary shape to the blade root 34. The recess 32 and the root 14 form a female/male coupling.

Such a fastening is known as a knife-edge fastening, and does not concern structural blades, i.e. the blades taking up the forces between the casing 20 and the hub 30.

However, on some turbine engines or some test beds, the blade 10 may operate in critical conditions, i.e. have a strong gyration combined with a strong vein convergence. Consequently, the management of recirculation in this area is essential for ensuring the performance of the engine.

The knife-edge fastening has two defects.

Firstly, the use of a recess means having a functional clearance for assembling and dismantling the blade 10. This clearance between the blade 10 and the hub 30 generates, in combination with the root vortex, losses detrimental to the performance of the module. Indeed, intrados/extrados recirculation may be present.

Secondly, in event of surge, the blade becomes deformed (flexure) under the effect of aerodynamic forces. This deformation may cause the ejection of the blade 10 from the recess 32.

There is thus a need for improving the knife-edge fastenings for the stator blades of turbine engines or turbine engine test beds.

DESCRIPTION OF THE INVENTION

To this end, the invention provides an assembly for a turbine engine or turbine engine test bed, comprising:
a hub defined about a longitudinal axis,
a blade, comprising a blade root, extending in a radial direction to the longitudinal axis,
the hub comprising a recess capable of receiving the blade root by insertion in the radial direction,
characterized in that:
the recess comprises a groove,
the blade root comprises a groove, so that the two grooves are facing each other when the blade root is inserted into the recess,
the assembly further comprises a seal located in the two grooves, wherein the seal comprises two opposite flanks, connected by a bottom, which are configured for being arranged against the walls of the recess, and wherein each flank of the seal comprises a blister that is located in the two grooves facing the recess and the blade root.

The invention may comprise the following features, taken alone or in combination:
the blade root is entirely surrounded by the seal, i.e. the blade root is completely covered by the seal,
the seal comprises a rigid reinforcement,
the rigid reinforcement is a plate or a plurality of wires, preferably metal,
the rigid reinforcement extends continuously between the two opposed blisters, passing through the two flanks and the bottom.
the rigid reinforcement extends at its ends into the blister, so that the ends are located in the groove of the blade root,
the seal is flush to the surface of the hub, in order to ensure aerodynamic continuity,
the blade root corresponds to the extension of a streamlined form of the blade,
the groove extends over a periphery of the recess,
the root has a rectangular section in a plane orthogonal or substantially orthogonal to the longitudinal axis,
the assembly comprises a plurality of blades, recesses and seals as defined in any one of the preceding claims, the assembly being typically a dual-flow turbine engine secondary flow straightener.

The invention also provides a turbine engine or test bed, for example, of a partial turbine engine type comprising an assembly as previously defined, this assembly being, for example, a single-flow straightener of the partial turbine engine constituting a vein which would correspond to a secondary vein in considering the case of a complete turbine engine.

DESCRIPTION OF THE FIGURES

Other features, objects and advantages of the invention will emerge from the following purely illustrative and non-restrictive description, which must be read with reference to the accompanying drawings.

FIG. 2 illustrates a knife-edge fastening without the seal, FIG. 3 illustrates a knife-edge fastening without the blade, FIG. 4 illustrates a complete knife-edge fastening.

DETAILED DESCRIPTION

A knife-edge fastening in conformity with the invention will be described with reference to FIGS. 2 through 4.

The case is considered of a turbine engine, typically a dual-flow turbine engine with straightener (OGV) arranged at the fan outlet, in the secondary vein. However, the invention is applicable on single-flow straighteners, for example, or any type of test bed in which a stator blade is used. Such a test bed is, for example, a partial engine making it possible, for example, to validate data on phenomena representative of those commonly occurring in the secondary vein of a complete engine.

Figure 1:
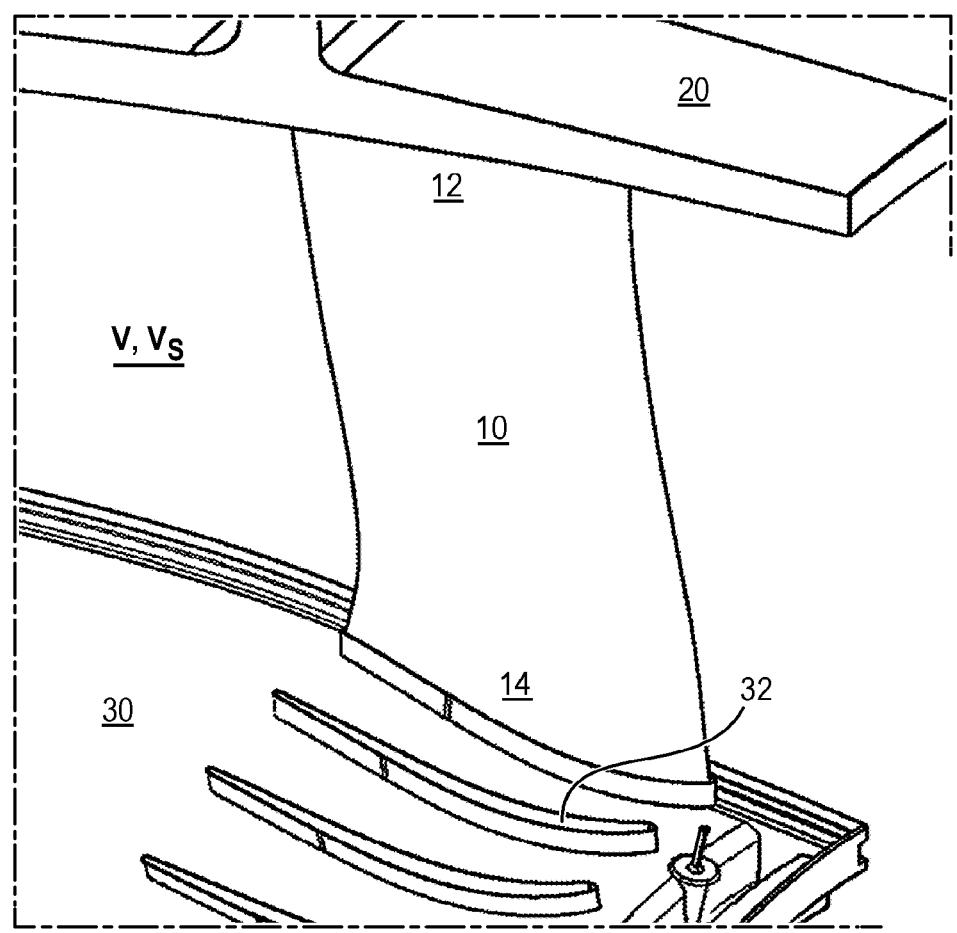
FIG. 1 illustrates a knife-edge fastening between a blade and a hub such as that existing in the prior art.
Figure 2:
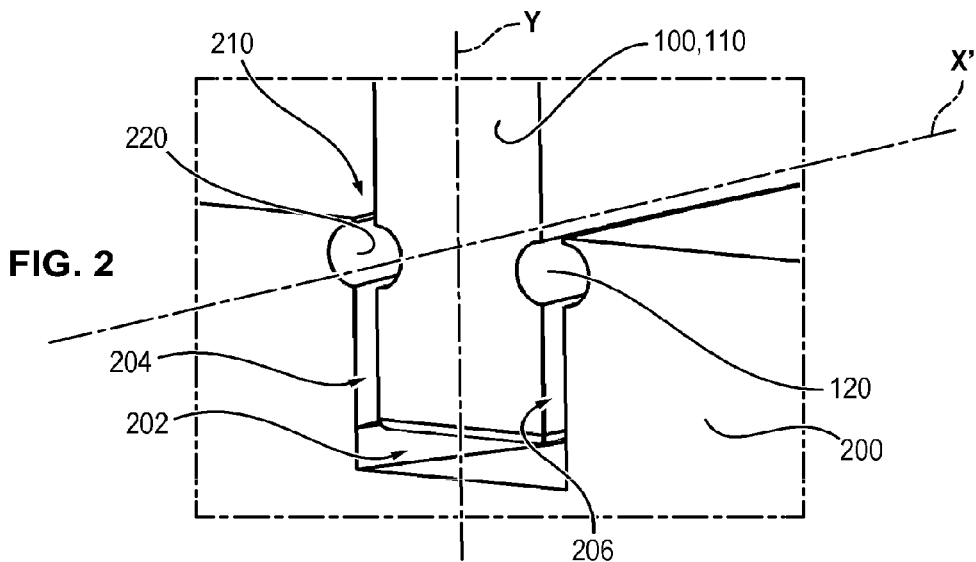
FIGS. 2 through 4 illustrate a knife-edge fastening between a blade and a hub according to two embodiments of the invention. More specifically.
Figure 3:
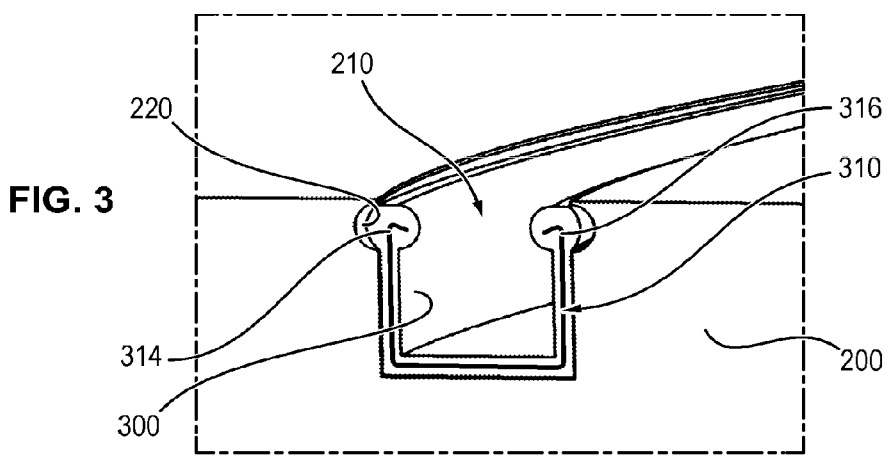

FIG. 2 illustrates a blade 100 comprising a blade root 110 at one end, which is typically a radially inner end of the blade 100. The blade root 110 is fastened to a hub 200, revolving about a longitudinal axis X (the axis X' represented in the figures is parallel to the axis X), which corresponds to a main axis of rotation of the turbine engine. The hub 200 forms part of the primary body of the turbine engine. The blade 100 extends in a radial direction Y with respect to the hub 200 (each blade therefore has its own radial direction Y).

At another end, radially outer, the blade 100 is fastened to a casing (not illustrated here). This aspect is not involved in the invention.

The blade 100 has a contoured shape for straightening the flow, notably with an intrados and an extrados. The blade 100 root 110 may be shaped in the extension of the intrados and the extrados. Alternatively, the root 110 may comprise a platform, i.e. a simplified geometrical shape, which facilitates the assembly of the blades 100 on the turbine engine. For example, on the surface of the hub 200, the platform has a substantially rectangular section.

Figure 4:
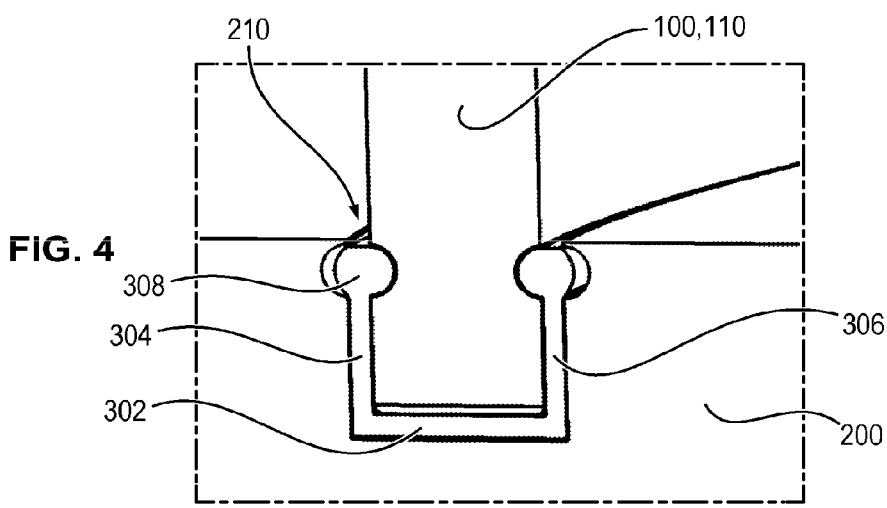

Locally, the section of the blade root 110 in a plane orthogonal to the longitudinal axis X is typically rectangular, as illustrated in FIGS. 2 and 4. Because of the potential curvature of the blade 100 and therefore of the blade root 110, this section may be made in a plane substantially orthogonal to the longitudinal axis X.

The hub 200 in its turn comprises a recess 210. This recess 210 may take the form of a groove traced in the hub 200, as illustrated in FIGS. 2 through 4. Alternatively, the recess 210 may take the form of a receptacle on the surface of the hub 200, i.e. it may extend radially outward from the hub 200.

The function of the recess 210 is to receive the blade root 110 in order to allow it to be locked longitudinally and tangentially. The blade root 110 and the recess 210 thus form an assembled male/female couple. Assembly takes place by moving the blade 100 in the radial direction Y toward the recess 210.

The recess is defined with a bottom 202 and two opposite lateral walls 204, 206 facing each other. The recess 210 also comprises two end walls (not represented). The lateral walls 204, 206 form a tangential stop and the end walls form a longitudinal stop.

A seal 300 is provided, between the blade root 110 and the recess 210.

To this end, the blade root 110 comprises a groove 120 for receiving a part of the seal 300 when the blade root 110 is installed in the recess 210.

The groove 120 extends over a periphery of the blade root 110.

Similarly, the recess 210 also comprises a groove 220 for receiving a part of the seal 300 when the blade root 110 is installed in the recess 210. In practice, each lateral wall 204, 206, or even the end walls, in practice comprise a groove 220.

The groove 220 extends over a periphery of the recess 200. Preferably, the groove 220 is located just under the surface of the hub 200, so that the seal 300 is flush and the junction between the surface of the hub 200 and the seal 300 is continuous.

The grooves may be of different section: semicircular (as illustrated), triangular, diamond-shaped, etc.

The two grooves 120, 220 are facing each other when the blade root 110 is inserted into the recess 210. In this way, the two grooves define a cavity having a volume greater than the clearance present between the walls 204, 206 of the recess 210 and the blade root 110. The seal 300 therefore has a section of substantially complementary shape to the grooves 120, 220.

The seal 300 is therefore fitted in the two grooves 110, 210, in order to block the radial movement of the blade 100, which prevents it from coming out of the cavity 210.

The seal 300 fills the whole functional clearance between the recess 210 and the blade root 110. For receiving the seal 300, the recess 210 may have a slightly larger dimension than that of the prior art, where there was no seal.

The seal 300 prevents air recirculation and, by being notably close to the open side of the recess 210, ensures aerodynamic continuity at the surface of the hub 200.

The recess 210 generally has a complementary shape to that of the blade root 110, for limiting the volume that has to be filled by the seal 300.

The seal is advantageously located over the whole periphery of the blade root (ends included).

For facilitating insertion, the seal 300, or more exactly the portion of the seal 300 in contact with the blade 100 has a suitable shape, e.g. rounded or beveled.

The seal 300 comprises a bottom 302 and two opposing flanks 304, 306 extending from the bottom 302 and facing each other. Each flank 304, 306 is next to a respective face of the blade root 110 and a respective wall 204, 206 of the recess 210. The seal 300 also comprises end flanks (not illustrated).

In this way, the seal 300 surrounds and completely covers the blade root 110 and prevents direct contacts between the hub 200 and the blade root 110, resulting in absorption of vibrations, for example.

Each flank 304, 306 of the seal 300 comprises a blister 308, in the form of a local excrescence of the seal 300. It is this blister 308 which, by being located in the grooves 120, 220 facing each other makes it possible to help hold the blade root 110 radially by abutting against the two grooves 120, 220.

The seal 300 is made of a flexible material assisting its sealing function, e.g. silicone, plastic, rubber or elastomer.

For assisting the holding of the blade root 110 in the recess 200, the seal 300 comprises a reinforcement 310 in form of a rigid insert located in the flexible material. The reinforcement 310 may be formed of a plate or a succession of wires, e.g. metal or a hard plastic type. A wire may also extend along the blister 308.

This reinforcement increases the resistance of the seal 300 to tearing via radial forces which may be exerted on the blade, notably during torsion. The movements of the blade 110 are thus better controlled.

In particular, the reinforcement 310 comprises, in a plane orthogonal or substantially orthogonal to the longitudinal axis X, two ends 314, 316 and extends continuously through the seal 300, from one blister 308 to the other (that of the opposite face of the recess), passing through the flank 304, the bottom 302 and the other flank 306. This continuity ensures a homogeneous and reliable reaction of the seal, each portion of the reinforcement 310 helping to hold the other portions of the reinforcement 310.

In the case of a plate, it may be a folded plate; in the case of wire, it may be a plurality of wires, arranged side by side along planes orthogonal or substantially orthogonal to the longitudinal axis X.

In a preferred embodiment, the end 314, 316 of the reinforcement 310 which is in the blister 308 approaches the edge of the blister 308 which is on the side of the blade root 110. In other words, the end 314, 316 of the reinforcement 310 does not remain in the blister 308 over a width equivalent to the width of the flank 304, 306 of the seal 310. In this way, when the blade root 110 is in place, the end 314, 316 of the reinforcement 310 is located in the groove 120 of the blade root 110 and exerts its force directly inside the latter. The radial holding of the blade is thus improved.

It is even possible to provide that the end 314, 316 of the reinforcement is in the form of a hook oriented toward the other blister.

Kit

The previously described elements may be manufactured and/or delivered in kit form, i.e. not assembled.

Assembly Method

An assembly method will now be described.

For the first embodiment, first of all, the seal 300 is placed into the recess 210, while ensuring that the blisters 308 are correctly placed in the grooves 120. Glue may be used for securing the seal 300 of the recess 210.

Then, the blade 100 is moved in the radial direction Y, corresponding to its direction of extension, so that the blade root 110 enters inside the recess 210 until the blister 308 of the seal 300 is engaged in the groove 120 of the blade root 110.

For dismantling the blade 100 from the hub 200, a special tool may be used for forcing the seal 300 against the hub 200, in practice against the bottom of the groove 210 in order to remove the blister 308 from the groove 120 of the blade root 100.

The invention claimed is:

1. An assembly for a turbine engine or turbine engine test bed, comprising:
    a hub defined about a longitudinal axis,
    a blade, comprising a blade root, extending in a radial direction to the longitudinal axis,
    the hub comprising a recess capable of receiving the blade root by insertion in the radial direction,
    wherein:
    the recess comprises a groove,
    the blade root comprises a groove, so that the two grooves are facing each other when the blade root is inserted into the recess,
    the assembly further comprises a seal located in the two grooves, wherein the seal comprises two opposite flanks, connected by a bottom, which are configured for being arranged against the walls of the recess, and wherein each flank of the seal comprises a blister that is located in the two grooves facing the recess and the blade root.

2. The assembly according to claim 1, wherein the blade root is entirely surrounded by the seal.

3. The assembly according to claim 1, wherein the seal comprises a rigid reinforcement.

4. The assembly according to claim 3, wherein the rigid reinforcement is a plate or a plurality of wires.

5. The assembly according to claim 3, wherein the rigid reinforcement extends continuously between the blisters, passing through the two flanks and the bottom.

6. The assembly according to claim 5, wherein the rigid reinforcement extends at its ends into the blister, so that the ends are located in the groove of the blade root.

7. The assembly according to claim 1, wherein the seal is flush to the surface of the hub in order to ensure aerodynamic continuity.

8. The assembly comprising a plurality of blades, recesses and seals as defined in claim 1, the assembly being a dual-flow turbine engine secondary flow straightener.

9. A turbine engine comprising an assembly according to claim 8.

10. A test bed for a partial turbine engine, the test bed comprising an assembly comprising a plurality of blades, recesses and seals as defined in claim 1, the assembly being a single-flow straightener of the partial turbine engine.

* * * * *